United States Patent [19]

Minter

[11] Patent Number: 4,730,380

[45] Date of Patent: Mar. 15, 1988

[54] METHOD OF FORMING A CURVED WINDOW ASSEMBLY

[75] Inventor: Mearl J. Minter, Oskaloosa, Iowa

[73] Assignee: Rolscreen Company, Pella, Iowa

[21] Appl. No.: 947,274

[22] Filed: Dec. 29, 1986

Related U.S. Application Data

[62] Division of Ser. No. 569,799, Jan. 11, 1984, Pat. No. 4,669,233.

[51] Int. Cl.⁴ .............................................. B23P 11/02

[52] U.S. Cl. ........................................ 29/445; 29/428; 29/DIG. 3

[58] Field of Search ................... 29/428, 445, DIG. 3; 52/86, 202, 248, 631

[56] References Cited

U.S. PATENT DOCUMENTS 2,810,941 10/1957 Mzinieri ................................ 52/201

3,844,020 10/1974 Hamilton .......................... 29/428 X 4,694,553 9/1987 Tate, Jr. et al. ...................... 29/445

*Primary Examiner*—P. W. Echols

*Assistant Examiner*—Ronald S. Wallace

*Attorney, Agent, or Firm*—Zarley, McKee, Thomte, Voorhees & Sease

[57] ABSTRACT

A window frame assembly for curved windows comprises a rigid frame member having a curved profile, a flexible frame member, and 'a plurality of individual window frame core blocks. The blocks are secured serially to the flexible frame member. The blocks and flexible frame member form a subassembly which is secured to the rigid frame member such that the subassembly assumes the curved profile of the rigid frame member. The blocks are preferably wood, the rigid frame member preferably an aluminum clad frame cover, and the assembly preferably provides an aluminum clad, wood core window frame assembly.

11 Claims, 4 Drawing Figures

METHOD OF FORMING A CURVED WINDOW ASSEMBLY

This is a division of application Ser. No. 569,799, filed Jan. 11, 1984, now U.S. Pat. No. 4,669,233, issued June 2, 1987.

BACKGROUND OF THE INVENTION

This invention relates to window frame assemblies and methods of formation of such assemblies.

In the art of manufacturing windows, wood frame cores are known to be desirable for insulation, condensation control, and pleasing, interior exposed wood. Aluminum cladding is known to be desirable for exterior wood parts, to be coated with baked enamel to resist weather and airborne contaminants. The baked enamel finish retains its appearance over time and resists fading, chipping, peeling and corrosion.

It is also known that increasing numbers of people desire a greater architectural richness in the detailing of home and office construction, including such detailing as arched and gothic peaked windows, which reflect the heritage of this and other countries.

SUMMARY OF THE INVENTION

An object of the inventor in making this invention was to provide a wood core, aluminum clad window in such desired shapes as semi-circular arches, gothic peaks, elliptical arches, full circles, and a variety of other desirable shapes.

Another object of the inventor was to accomplish the foregoing with a window frame assembly manufacturing process which provides for economically favorable manufacture of such windows.

Accomplishing these objects, the invention is, in a principal aspect, a window frame assembly comprising, first, a rigid frame member, such as an aluminum cladding member, having a curved profile. The assembly further comprises a flexible frame member, and a plurality of individual window frame core blocks. The core blocks are secured serially to the flexible frame member. The core blocks and the flexible frame member form a subassembly secured to the rigid frame member. The core blocks and flexible frame member are secured to the rigid frame member such that the subassembly assumes the curved profile of the rigid frame member.

The assembly is created by, first, by forming the rigid and flexible frame members and the core blocks, with the rigid frame member bent to the curved profile. The plurality of core blocks are then secured to the flexible frame member to form the subassembly. The subassembly is then secured to the rigid frame member, as by sliding of a flange of the rigid frame member into a slot formed in the core blocks.

The core blocks provide the core of the frame assembly, and may, as preferred, be wood. The rigid frame member may be aluminum as stated. Thus, the assembly may be a wood core, aluminum clad window frame assembly. If a semi-circular, fixed panel window is desired, the curved profile of the rigid frame member is semi-circular, and the resulting assembly is semi-circular. The assembly is completed to form a window with the inclusion of a frame sill assembly, window glass, and such veneer strips, window panel stops and the like as may be desirable.

BRIEF DESCRIPTION OF THE DRAWING

The peferred embodiments of the invention are described in the following detailed description of the preferred embodiments with reference to the accompanying drawing. The drawing includes four figures, as follows.

DETAILED DESCRIPTION OF THE PREFERRED EMBODIMENT

Figure 1:
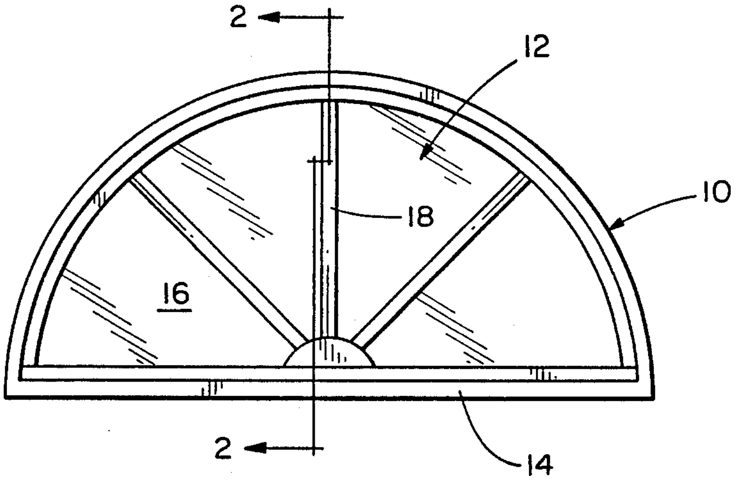
FIG. 1 is an exterior elevation view of the preferred window frame assembly of the invention, with muntin bars in a sunburst pattern.

Referring to FIG. 1, the preferred embodiment of the invention is a window frame assembly 10 incorporated in, by example, a semi-circular, fixed panel window 12. The assembly 10 forms the curved portion of the frame of the window 12. A sill assembly 14 completes the frame of the window 12, and insulating glass 16 fits the frame. Muntin bars such as bar 18 are removably mounted in a sunburst pattern on the interior of the window 12 for pleasing appearance, and easy window cleaning when removed.

Figure 2:
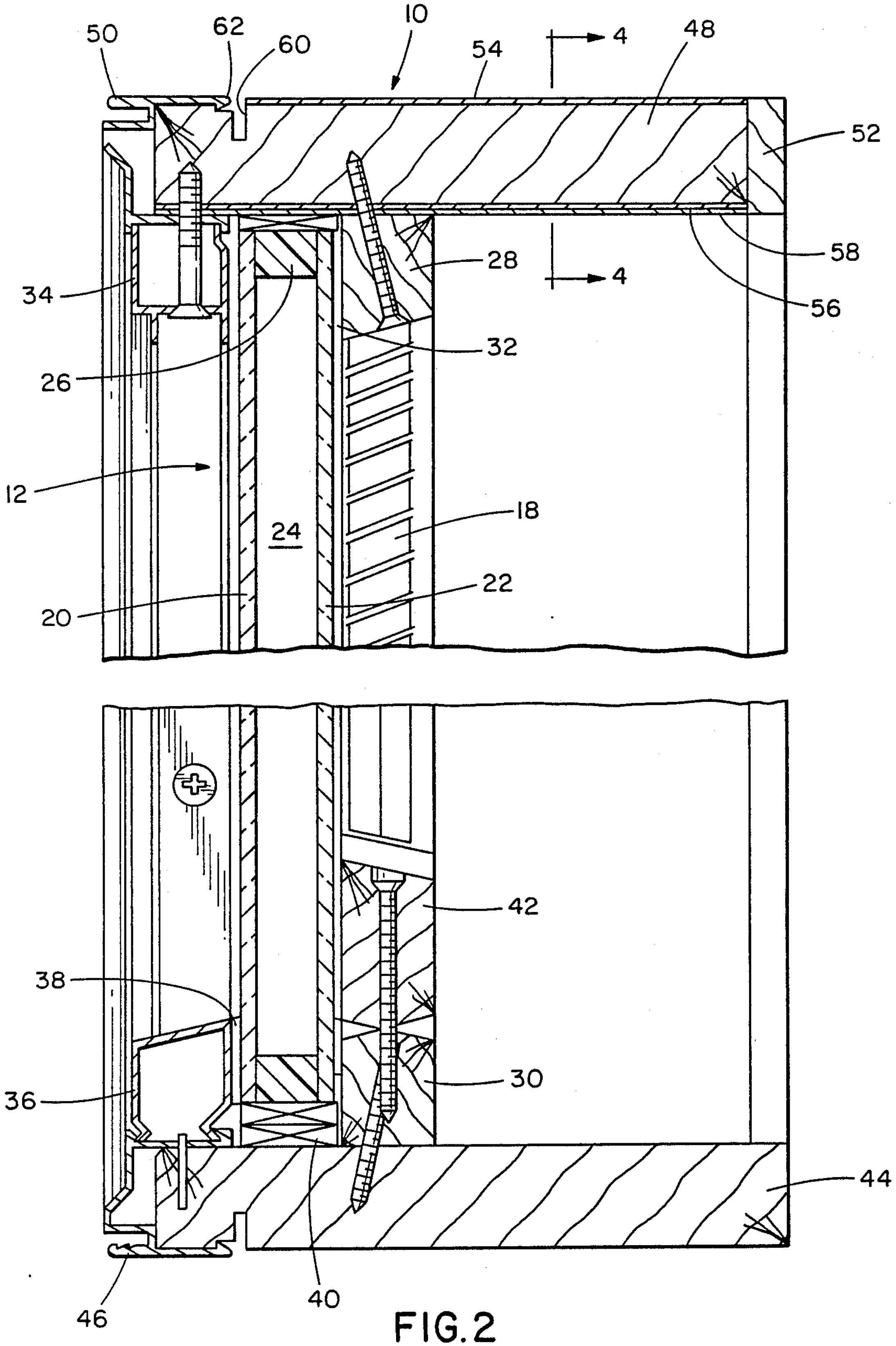
FIG. 2 is a cross-section view of the preferred window frame assembly, with the unsectioned central portion of the assembly removed, as taken along line 2—2 of FIG. 1.

As shown in FIG. 2, the exterior side of the window 12 is to the left and the interior is to the right. The window glass 16 includes two panes 20, 22 separated to form an interposed air space 24 by spacers such as 26. The window 12 is held in position on the frame from the interior by an interior, curved glazing stop 28 screwed to the curved frame assembly 10 and an interior, sill glazing stop 30 screwed to the sill assembly 14. Polyvinylchloride foam tape 32 insulates between the window 12 and the stops 28, 30. From the exterior, the window 12 is held to the frame by an aluminum extruded, curved, exterior glazing stop 34 screwed to the curved frame assembly 10 and an exterior, sill glazing stop 36 secured to the sill frame assembly 14. The window facing edges of the stops 34, 36 are serrated, and butyl sealant 38 seals any gap between the stops 34, 36 and the window 12. Setting blocks 40 support and provide for the setting of the window 12. The sunburst 42 is screwed atop the interior sill stop 30.

A wooden sill frame 44 forms, in part, the sill frame assembly 14. The sill frame 44 provides the interior sill of the sill frame assembly, wooden interior surfaces of the window, and a wooden core of the sill frame assembly. An aluminum extruded sill frame cover 46 is attached to the exterior portion of the sill frame 44. The sill frame cover 46 provides an aluminum clad exterior of the sill frame assembly.

The frame assembly 10, as most preferred, includes a plurality of wooden core blocks such as block 48 in FIG. 2, and an aluminum extruded, curved frame cover 50. The core blocks provide a wooden core of the frame assembly 10, and the curved frame cover 50 provides an aluminum clad exterior of the frame assembly 10. A wooden edge band 52 is glued to the horizontal interiormost surface of the core blocks to provide a wooden interior face of the frame assembly 10.

A flexible, outer frame member 54, a flexible inner frame member 56, and a flexible inner wooden veneer strip 58 complete the assembly 10. The frame members 54, 56 are preferably formed of yorkite, and extend along the exterior and interior, respectively, of the core blocks. The flexible frame members 54, 56 and the veneer strip 58 are glued to the core blocks 48, with the veneer strip 58 glued to the core blocks over the flexible interior frame member 56 to provide a wooden interior surface of the frame assembly 10.

Figure 3:
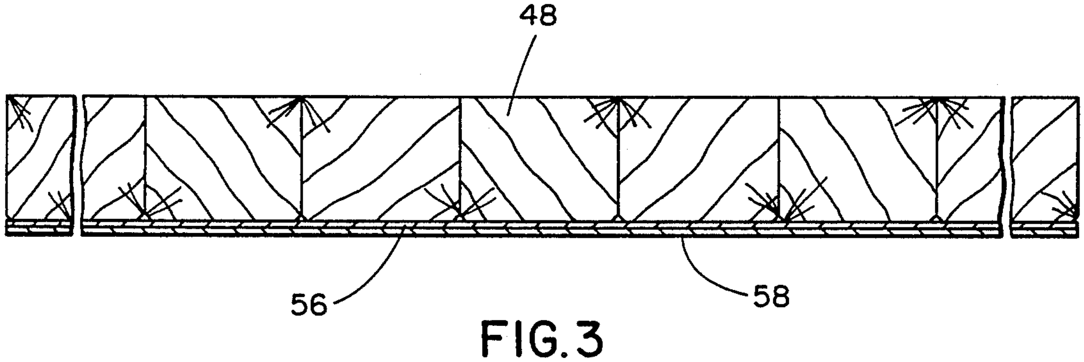
FIG. 3 is a view of a subassembly of the preferred window frame assembly as the subassembly is being formed.
Figure 4:
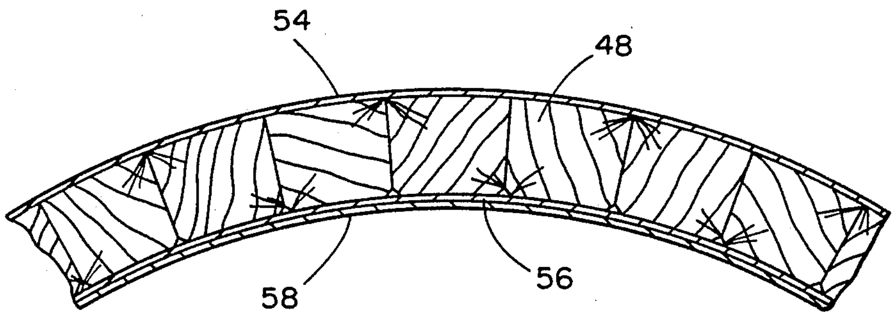
FIG. 4 is another view of the subassembly of FIG. 3, during a later step of formation of the subassembly.

The sill frame assembly 14, insulating glass 16 and components of the window 12 other than the frame assembly 10 are formed as conventional. The frame assembly 10 is formed as follows, with reference to FIGS. 3 and 4. The cover 50 is extruded, and bent to shape. The interior frame member 56 and the veneer strip 58 are formed in elongated rectangular shape, run through a glue spreader, and laid on a flat surface. The member 56 and the veneer strip 58 are laid with the veneer strip on bottom and the member 56 glued atop the veneer strip with edges in alignment. The core blocks such as 48 are then glued serially along the flexible frame member 56. The core blocks are elongated and most preferably have a rectangular cross-section of dimensions about one inch by three-fourths inch. Two adjacent, elongated edges of the core blocks are chamfered. The core blocks are laid on the frame member 56 transverse to the frame member 56. That is, the core blocks are placed on the frame member 56 such that the longest dimension of the core blocks is at a right angle to the longest dimension of the frame member 56. The core blocks are glued to the frame member 56 with the chamfered corners down, on the frame member 56, and with the core members in tight physical contact with each other.

The frame member 56 and veneer strip 58 may have a length and width sufficient to form a single frame assembly 10 without break in the members 56, 58. As most preferred, the frame member 56 and the veneer strip 58 have a length sufficient to form two end-to-end frame assemblies 10, and a width sufficient to form two side-by-side frame assemblies 10. As a result, four frame assemblies 10 may be cut from the resulting subassembly. To complete the subassembly, the core blocks have a length sufficient to form two frame assemblies 10 and are provided in a number sufficient to cover substantially completely the length of the frame member 56.

The subassembly of the frame member 56, veneer strip 58 and core blocks is cut to form four subassemblies for four frame assemblies 10, and a groove or slot is routed along the subassembly through the core blocks. Each core block receives or has the slot, aligned with the slots of all the other blocks. This slot 60, shown in FIG. 2, will provide for mating of the frame subassembly with the frame cover 50.

At this stage, the subassembly is flexible, and may be curved in a circle with the core blocks outward of the flexible frame member 56. In this condition, the subassembly is slid into assembly with the frame cover 50. A frame cover flange 62 of the cover 50 slides along and within the core block slots 60, retaining the subassembly against non-sliding separation from the cover 50. The core blocks are thus secured to the frame cover 50 such that the subassembly assumes the curved profile of the frame member 50. The flexible exterior frame member 54 is then curved about and glued to the exterior of the core blocks, as in FIG. 4, to further secure the subassembly in the curved profile of the frame cover 50.

Finally, the edge band 52 is installed. As preferred, the edge band is installed in segments having mating ends, and straight sides which are routed to the curved shape of the frame assembly 10. The edge band 52 hides from view the edges of the flexible frame members 54, 56.

The preferred window frame assembly 10 of the invention, and the preferred method of making it are now described. The semi-circular shape of the window 10 is exemplary, as stated, and the frame assembly 10 may be employed as described to form windows which are fully circular, peaked gothic, elliptically peaked, and otherwise. Other modifications to the frame assembly of the window 12 and the method of making the frame assembly 10 may also be made, without departing from the invention. Therefore, to particularly point out and distinctly claim the subject matter regarded as invention, the following claims conclude this specification.

What is claimed:

1. A method of assembling a window frame assembly comprising:
forming a rigid frame member;
forming a plurality of core blocks;
forming a flexible frame member;
bending the rigid frame member to a curved profile;
securing the plurality of core blocks to the flexible brame member to form a subassembly; and then
securing the subassembly to the rigid frame member such that the subassembly assumes the cruved profile of the rigid frame member.

2. A method as in claim 1 further comprising:
forming a second flexible frame member; and
securing the second flexible frame member to the core blocks opposite the first flexible frame member after the subassembly is secured to the rigid frame member.

3. A method as in claim 1 further comprising:
forming the rigid frame member with a flange;
forming a slot in each of the core blocks aligned with the slots of the other core blocks; and
securing the subassembly to the rigid frame member at least in part by inserting the flange in the slots.

4. A method as in claim 1 further comprising:
forming the core blocks of wood.

5. A method as in claim 1 further comprising:
bending the rigid frame member in a semicircular curved profile.

6. A method as in claim 1 further comprising:
forming a second rigid frame member;
forming a window pane; and
securing the second rigid frame member, the window pane, the first rigid frame member and the subassembly into a window assembly.

7. A method as in claim 1 further comprising:
securing the plurality of core blocks to the flexible frame member while the flexible frame member is positioned substantially planar.

8. A method as in claim 1 further comprising:
securing the plurality of core blocks to the flexible frame member immediately adjacent each other on the flexible frame member.

9. A method as in claim 1 further comprising:
forming and securing an interior edge band to the subassembly to provide an interior window edge therefor.

10. A method as in claim 1 further comprising:
forming a flexible veneer strip; and securing the flexible veneer strip to the flexible frame member to provide a veneered surface therefor.

11. A method of assembling an exterior aluminum clad, interior wood veneered, substantially wood core window assembly comprising:

forming a frame curved assembly by, forming an exterior aluminum frame cover having a length and a flange, bending the exterior aluminum frame cover to a curved profile, forming an inner, flexible frame member of substantially the same length as the frame cover, forming a plurality of wooden, individual frame core blocks each with a slot, adhering the plurality of core blocks serially, immediately adjacent each aother, on substantially the whole length of the flexible frame member, with the slots aligned, to form a subassembly, securing the subassembly to the bended frame cover with the frame cover flange in the core block slots such that the subassembly assumes the curved profile of the bended frame cover, forming an inner wood veneer strip for the frame curved assembly of substantially the same length as the inner frame member, adhering the inner wood veneer strip to the inner frame member to provide an inner wooden veneer of the frame curved assembly, forming an outer flexible frame member of substantially the same length as the frame cover, adhering the outer flexible frame member to the core blocks, forming an interior wooden edge band of substantially the same length as the frame cover, having the curved profile, adhering the interior wooden edge band to the core blocks to provide an interior wooden edge of the frame curved assembly, forming a frame sill assembly by, forming an exterior aluminum sill cover, forming a wood frame sill, and securing the sill cover to the sill;

joining the frame sill assembly to the frame curved assembly;

forming a glazing panel;

forming glazing panel stops; and securing the glazing panel and the glazing panel stops to the frame curved assembly and the frame sill assembly.

* * * * *